Feb. 1, 1955 A. G. CHAMBERLAIN 2,701,280

PIEZOELECTRIC PHONOGRAPH PICKUP

Filed Feb. 27, 1951

*Inventor*
ALLAN GEOFFREY CHAMBERLAIN
By Ralph E. Atherton
*Attorney*

United States Patent Office 2,701,280

Patented Feb. 1, 1955

2,701,280

PIEZOELECTRIC PHONOGRAPH PICKUP

Allan Geoffrey Chamberlain, Reading, England, assignor to Electric & Musical Industries Limited, Hayes, England, a British company Application February 27, 1951, Serial No. 212,850

Claims priority, application Great Britain March 2, 1950

5 Claims. (Cl. 179—100.41)

This invention relates to piezoelectric phonograph pick-ups. In some cases it may be desired to make provision for the pick-up to carry two styli suitable for use respectively in playing records of the conventional type and also records of the long-playing type having relatively narrow grooves and adapted, in operation, to rotate at relatively low singular speeds, for example 33 or 45 revolutions per minute.

According to the invention, a phonograph pick-up is provided comprising a piezoelectric member, a casing housing said member, means mounting said member in said casing for tortional vibration about an axis extending from end to end of said member, said mounting means comprising blocks of resilient material embracing said member at each end thereof and blocks of resilient material embracing said member substantially at the centre thereof, a stylus arm coupled to said member at one end thereof on said axis and a second stylus arm coupled to said member at the opposite end thereof on said axis, said mounting means having sufficient stiffness to prevent substantial transmission between said arms of movement imparted to one arm by the groove of a phonograph record.

Figure 1:
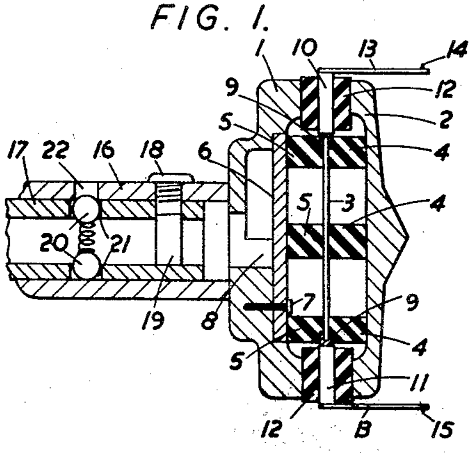
Figure 2:
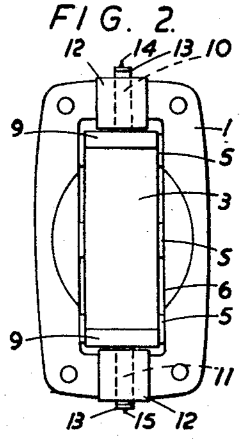
Figure 3:
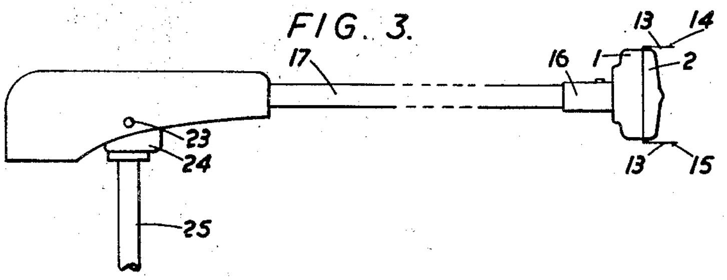

In order that the said invention may be clearly understood and readily carried into effect, it will now be more fully described with reference to the accompanying drawing, in which:

Figure 1 is a sectional view of a pick-up according to the invention and part of a pick-up arm, Figure 2 is a front view of the pick-up with one of the parts of the casing thereof removed, and Figure 3 is a side view of a pick-up in accordance with the invention mounted on a pick-up arm.

Referring to the drawing, the pick-up shown includes a casing made in two parts 1 and 2, made for example from metal, secured together by screws (not shown) and within said casing is disposed a thin rectangular plate 3, made from Rochelle salt or other piezoelectric material, which is mounted between blocks 4 and 5 of resilient electrically insulating material. The blocks 4 and 5 are under slight compression, the blocks 4 bearing against the inner surface of the part 2 of the casing and the blocks 5 bearing against a panel 6 of electrically insulating material which is secured to the part 1 of the casing by a screw 7. Electrodes (not shown) are provided on the wide faces of plate 3 and may be connected to rivets carried by the panel 6, electrical leads also being connected to said rivets and extending through an opening 8 in the part 1 of the casing. To the ends of the plate 3 are secured clips 9 which are secured to the ends of shafts 10 and 11 which project through bushes 12 of resilient electrically insulating material accommodated in recesses in the parts 1 and 2. Thin metal arms 13 soldered or otherwise secured at one end to the shafts 10 and 11 carry at their other ends styli 14 and 15 respectively, made for example from sapphire. The arms 13 as shown extend normally from the plane of the plate 3 and project from the same side thereof. One of said styli is formed with a tip of suitable radius, for example 0.003 inch, such that it is suitable for use in playing conventional records, and the other stylus is formed with a tip of smaller radius, for example 0.001 inch, such that it is suitable for use in playing long-playing records.

The pick-up is adapted to be mounted on a pick-up arm in such manner that the stylus 14 or 15 can be arranged to project downwardly according to the type of record to be played. In the arrangement shown the part 1 of the casing is provided with a tubular extension 16 which fits over the end of a pick-up arm 17 so as to be rotatable thereon. A screw 18 projects through a screw hole in the extension 16 and into a semi-annular slot 19 in the arm 17, so that longitudinal movement of the pick-up with respect to the pick-up arm 17 is prevented but the device can be turned through 180° from the position shown in Figure 1 to bring the stylus 14 lowermost instead of the stylus 15. In order to arrest the pick-up in either angular position diametrically arranged spring-pressed balls 20 are provided which project through holes 21 in the arm 17, one or other of said balls being adapted to project into a hole 22 in the extension 16 according to the angular position of the pick-up. The pick-up arm 17 is mounted in customary manner for angular movement about a horizontal pivot 23 (Figure 3) carried by a bracket 24 secured to the upper end of an angularly movable vertical post 25. The axis of the arm 13 is normal to the plane of the plate 3 and passes through the centre thereof.

In operation, vibrations of the stylus 14 or 15 as the case may be tend to rotate plate 3 as a whole about its longitudinal axis, but due to the relatively high mass of the plate 3 and the opposing action of the blocks 4 and 5 torque applied to one end of the plate 3 is not transmitted entirely or at all to the other end, so that the plate executes torsional vibrations about its longitudinal axis. A potential difference varying in accordance with the movements of the operative stylus is thereby set up between the above-mentioned electrodes. The damping exerted by the blocks 4 and 5 also tends to remove undesired resonance.

A pick-up embodying the invention has been found to give more uniform frequency response than an arrangement in which two styli are connected to the same end of the piezo-electric member.

What I claim is:

1. A phonograph pick-up comprising a piezoelectric member, a casing housing said member, means mounting said member in said casing for tortional vibration about an axis extending from end to end of said member, said mounting means comprising blocks of resilient material embracing said member at each end thereof and blocks of resilient material embracing said member substantially at the centre thereof, a stylus arm coupled to said member at one end thereof on said axis, and a second stylus arm coupled to said member at the opposite end thereof on said axis, said mounting means having sufficient stiffness to prevent substantial transmission between said arms of movement imparted to one arm by the groove of a phonograph record.

2. A phonograph pick-up comprising a piezoelectric member, a casing housing said member, means mounting said member in said casing for tortional vibration about an axis extending from end to end of said member, said mounting means comprising blocks of resilient material embracing said member at each end thereof and blocks of resilient material embracing said member substantially at the centre thereof, a stylus arm coupled to said member at one end thereof on said axis and extending substantially normally from the plane of said member, and a second stylus arm coupled to said member at the opposite end thereof on said axis and extending substantially normally to the plane of said member and on the same side thereof as said first-mentioned arm, said mounting means having sufficient stiffness to prevent substantial transmission between said arms of movement imparted to one arm by the groove of a phonograph record.

3. A phonograph pick-up comprising a piezoelectric member of elongated form, a casing housing said member, means mounting said member in said casing for tortional vibration about an axis extending from end to end of said member and substantially parallel to the longitudinal axis of said elongated member, said mounting means comprising blocks of resilient material embracing said member at each end thereof and blocks of resilient material embracing said member substantially at the centre thereof, a resilient bush mounted in said casing at one end of said member, a shaft engaging said bush and coupled to one end of said member on said axis, a stylus arm coupled to said shaft and extending substantially normally to the plane of said member, a second bush of resilient material mounted in said casing at the other end of said member, a second shaft engaging said bush and coupled to said other end of said member on said axis, and a stylus arm coupled to said second shaft and extending substantially normally to the plane of said member on the same side thereof as said first-mentioned stylus arm, said mounting means having sufficient stiffness to prevent substantial transmission between said arms of movement imparted to one arm by the groove of a phonograph record.

4. A phonograph pick-up rotatably mounted on a pick-up arm, said pick-up comprising a piezoelectric member, a casing housing said member, means mounting said member in said casing for tortional vibration about an axis extending from end to end of said member with said member in a plane substantially normal to the axis of said pick-up arm with the axis of said pick-up arm passing through the centre of said member, said mounting means comprising blocks of resilient material embracing said member at each end thereof and blocks of resilient material embracing said member substantially at the centre thereof, a stylus arm coupled to said member at one end thereof on said axis, and a second stylus arm coupled to said member at the opposite end thereof on said axis, said mounting means having sufficient stiffness to prevent substantial transmission between said arms of movement imparted to one arm by the groove of a phonograph record.

5. A phonograph pick-up rotatably mounted on a pick-up arm, said pick-up comprising a piezoelectric member, a casing housing said member, means mounting said member in said casing for tortional vibration about an axis extending from end to end of said member with said member in a plane substantially normal to the axis of said pick-up arm with the axis of said pick-up arm passing through the centre of said member, said mounting means comprising blocks of resilient material embracing said member at each end thereof and blocks of resilient material embracing said member substantially at the centre thereof, a resilient bush mounted in said casing at one end of said member, a shaft engaging said bush and coupled to one end of said member on said axis, a stylus arm coupled to said shaft and extending substantially normally to the plane of said member, a second bush of resilient material mounted in said casing at the other end of said member, a second shaft engaging said bush and coupled to said other end of said member on said axis, and a stylus arm coupled to said second shaft and extending substantially normally to the plane of said member on the same side thereof as said first-mentioned stylus arm, said mounting means having sufficient stiffness to prevent substantial transmission between said arms of movement imparted to one arm by the groove of a phonograph record.

References Cited in the file of this patent

UNITED STATES PATENTS

| | | |
|---|---|---|
| 2,313,129 | Dohan | Mar. 9, 1943 |
| 2,479,894 | Andrews | Aug. 23, 1949 |
| 2,570,578 | Martin | Oct. 9, 1951 |
| 2,594,948 | Lynch | Apr. 29, 1952 |
| 2,617,895 | Angle et al. | Nov. 11, 1952 |